Patented July 29, 1930

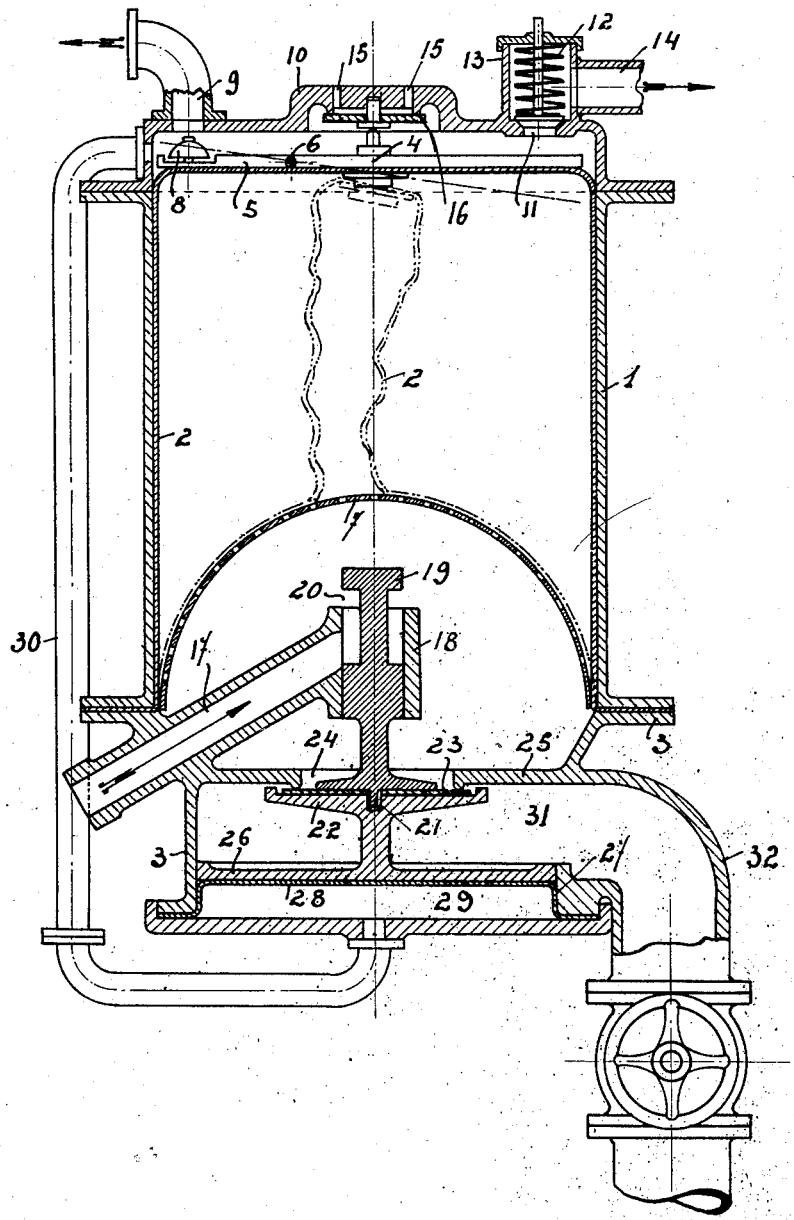

1,771,424

UNITED STATES PATENT OFFICE

ARSÈNE STEURS, OF BOURGEOIS-RIXENSART, BELGIUM

FLUID-ACTUATED COMPRESSOR

Application filed October 4, 1928. Serial No. 310,262, and in Belgium October 8, 1927.

My invention relates to fluid actuated compressors, and especially to a compressor which works by means of a fluid under pressure and which is intended to be used especially in breweries in order to distribute compressed air under a constant pressure for drawing off beers. This apparatus can be applied however also to other uses wherein bottles or vessels containing compressed air are employed, as for instance for the projection of colouring materials by means of dry air or for any other uses.

It has for its object to furnish an apparatus of particularly simple construction, adapted to work automatically without the help of floats and having the great advantage of avoiding any contact between the working fluid and the air or other fluid to be compressed.

With this object in view my invention essentially consists in the special arrangements and combinations of parts hereinafter fully described and pointed out in the appended claims.

The annexed drawing shows by way of example in cross section, an apparatus constructed according to my invention.

The apparatus shown comprises a tank 1 in the interior of which a rubber bag 2 is fixed, which is adapted to come in contact with approximately the whole of the inner periphery of the tank 1. This bag 2 which forms a tight joint at its lower part with a bottom 3, is suspended at a point 4 from a plate 5 oscillating on pivots 6 fixed to the wall of the tank. When the bag 2 is emptied it collapses so that its lower portion overlies a perforated wall 7 of curved or dome shape. The plate 5, the diameter of which is slightly smaller than the diameter of the reservoir 1, so that a passage is formed between the periphery of said plate and the wall of the reservoir 1, carries a valve 8 which in its normal position closes an opening 9 provided in the head 10 closing the upper end of the reservoir.

Moreover, this head is provided with an opening 11 which is normally closed by a valve 12 acted upon by a spring. This valve 12 is disposed in a chamber 13 which communicates with a delivery pipe 14 by which the compressed air may be delivered into a reservoir or to any point where the compressed air is to be used. The head 10 is provided also with a series of openings 15 for the introduction of air which openings are normally closed by a rubber diaphragm 16 which offers a certain resistance to the admission of the air through the openings 15.

The bottom 3 of the reservoir is provided with an inlet pipe 17 for a fluid under pressure, preferably water, and this pipe, which is provided with a stop valve (not shown) extends into the space defined by the perforated wall 7 and terminates in a ring nozzle 18 in which is adapted to be displaced a distributing piston 19 provided with a groove 20 allowing the outflow of the liquid under pressure admitted through the pipe 17 when the piston 19 is in the raised position shown in the drawing. The piston 19 is connected at 21 with a valve 22 provided with a suitable gasket 23, for instance of rubber, closing an opening 24 provided in a false bottom 25. Moreover this valve 22 carries a piston 26 which is adapted to be displaced in a cylindrical member 27 which is rendered fluid tight below the piston 26 by means of a rubber bag 28. The chamber 29 thus formed beneath the piston 26 is in communication through a pipe 30 with the upper part of the tank 1 above the plate 5, in order to equalize the pressure between the chamber 29 and the upper part of the tank 1. The chamber 31 formed between the false bottom 25 and the piston 26 communicates with an outlet pipe 32, having an appropriate section and preferably provided with a valve controlling the flow of the water.

The pipe 32 is of predetermined height and is immersed into a water tank not shown arranged at a lower level so as to produce a suction water column of a given intensity according to the height of the pipe 32.

The described apparatus works in the following manner:

The apparatus is started by initially filling the bag 2 with water by any suitable means, whereby the air will be driven out of said bag so that the bag is expanded into contact with the wall of the tank. This initial filling is preferably done before completely assembling the apparatus and with the tank in upside down position. The lower portion of the apparatus is then secured to the flange of the tank, with the edge of the bag clamped between them. The apparatus is then inverted, whereupon the bag will discharge the water through the perforated wall 7 until said bag is collapsed on said wall as shown in dotted lines on the drawing. At this moment the depression produced in the chamber 31 causes the piston 26 to rise in the chamber 27 thus closing the valve 22 and opening the admission member or piston 19. Fluid (for instance water under pressure) is thereby admitted into the bag through the pipe 17 and the groove 20 of the piston 19, thereby expanding the bag and causing its wall to impinge against the wall of the tank 1, as shown in the drawing in full lines. As a result the air contained in the tank 1 is compressed and raises the valve 12 against the tension of its spring, thus permitting escape of the compressed air through the opening 11 and discharge pipe 14 towards the storage tank. When the bag 2 is completely expanded, the plate 5 which acts as a lever, oscillates on its pivots and moves the valve 8 from its seat. It will be observed, that till this moment, the compressed air was exerting its action through the pipe 30 in the chamber 29 and was keeping the piston 26 in its raised position. Consequently, opening of the valve 8 permits the escape through the opening 9 of the compressed air still contained in the upper part of the tank 1 and also causes a fall of pressure to take place in the chamber 29 so that the weight of the water contained in the bag added to the action of the pressure of the water which is still admitted by the pipe 17, on the valve 22, causes said valve to open and permits the escape of the water through the pipe 32. The suction of the valve 22 being sufficiently great with respect to the suction of the valve-controlled pipe 32 the water flows out of the bag 2 through the pipe 32 and as the collapse of the bag begins the valve 8 is closed instantaneously and the bag eventually is completely collapsed so that its lower portion again lies in contact with the perforated wall 7, as shown on the drawing in dotted lines.

The collapsing of the bag permits the opening of valve 16 and produces a suction of the outer air through the openings 15, which suction acts also in the pipe 30, and thus maintains the valve 22 in its opened position and permits the escape of the water through the pipe 32 until under the action of the depression produced by the suction column the distributing piston 19 is again raised by the piston 26 and is thus returned to its open position so as to again admit water under pressure to the tank whilst the valve 22 controlling the escape is closed.

It will thus be obvious that the operation of the apparatus is completely automatic and that it is adapted to act as an automatic pressure regulator for maintaining in the compressed air tank connected to the pipe 14 a constant pressure substantially equal to the pressure of the water operating as a motor fluid.

What I claim is:

1. A fluid-actuated compressor, comprising in combination, a tank, an expansible member disposed within said tank, means for admitting a fluid to be compressed between said tank and expansible member, means for admitting a fluid under pressure to said expansible member thereby to expand the same and compress said first fluid, and means automatically actuated by the expansion of said member to shut off the supply of fluid under pressure.

2. A fluid-actuated compressor, comprising in combination, a tank, an expansible member disposed within said tank and adapted to be expanded into contact with the wall of the tank, valve-controlled means for admitting a fluid under pressure into said expansible member, means for admitting a fluid to be compressed into the tank at the upper end thereof, whereby the expansion of said member will cause the compression of said last fluid, and means operative during said compression to produce unequal pressures in the upper and lower portions of the tank thereby to control the operation of said valve-controlled means.

3. A fluid-actuated compressor, comprising in combination, a tank, an expansible member disposed within the tank and adapted to be expanded into contact with the wall of said tank, said tank being provided in its bottom wall with an opening, means for admitting a fluid to be compressed into the upper portion of the tank, an air-tight chamber disposed below said tank and adapted to communicate therewith through said opening, a piston mounted for reciprocation in said chamber, a valve rigid with said piston and adapted normally to close said opening, a distributing valve communicating with said expansible member for admitting fluid under pressure thereto, and a pipe communicating at one end with the upper part of the tank and at its opposite end with said air-tight chamber thereby to cause variations of pressure in the tank and chamber whereby said distributing valve is actuated to control the admission of fluid under pressure.

4. A fluid-actuated compressor, comprising in combination, a tank provided with an opening in its bottom, a head for closing the upper end of said tank, an expansible member disposed within the tank and adapted to be expanded into contact with the wall of said tank, means in said head for admitting a fluid to be compressed between the expansible member and tank, a valved outlet in said head adapted to be opened under pressure of said expansible member, a second valved outlet in the head adapted to be opened under the expanding action of said member when the latter has reached its limit of expansion, an air-tight chamber disposed below said tank and communicating with said bag through said opening, a piston reciprocable in said chamber, a valve rigid with said piston and adapted normally to close said opening, a distributing piston for admitting fluid under pressure into said expansible member and operatively connected with said valve, and a pipe communicating at one end with the upper part of the tank and at its opposite end with said chamber for reducing the pressure in said chamber thereby to control the operation of said valve and pistons.

5. A fluid-actuated compressor, comprising in combination, a tank provided with an opening in its bottom, an expansible member disposed in said tank and adapted to be expanded into contact with the wall of the tank, means for admitting fluid to be compressed into the upper part of the tank, an air-tight chamber disposed below said tank and communicating with said expansible member through said opening, a piston reciprocable in said chamber, a valve rigid with said piston and adapted normally to close said opening, a distributing piston for admitting fluid under pressure to said expansible member and operatively connected with said valve, a pipe communicating at one end with the upper part of the tank and at its opposite end with said chamber for varying the pressure in the tank and controlling the operation of said valve and pistons, and an outlet pipe for the fluid under pressure communicating with a chamber formed between said air-tight chamber and said valve, said outlet pipe being adapted to form a suction water column.

6. A fluid-actuated compressor, comprising in combination, a tank provided with an opening in its bottom, a curved perforated wall extending above the bottom of the tank and forming therewith a chamber, a head for closing the upper end of the tank, means in said head for admitting fluid to be compressed, an oscillatable plate disposed below said head, an expansible member suspended from said plate and disposed within the tank and between said plate and said perforated wall, said expansible member being adapted to be expanded into contact with the wall of the tank, a valved delivery outlet in said head adapted to be opened during the expansion of said member, a second valved outlet in said head adapted to be opened under the expanding action of said member when the latter has been completely expanded, a distributing pipe communicating with the chamber formed between said perforated wall and bottom for delivering fluid under pressure thereto, an air-tight chamber disposed below said tank, a piston reciprocable in said chamber, a valve rigid with said piston and normally closing said opening, a distributing piston for controlling the delivery of fluid under pressure and operatively connected with said valve, a pipe communicating at one end with the space above the plate at the upper part of the tank and at its opposite end with said air-tight chamber for reducing the pressure in said chamber and closing said distributing piston, and an outlet pipe communicating with a chamber formed between said air-tight chamber and said valve, said pipe being adapted to form a suction water column.

In testimony whereof I have affixed my signature.

ARSÈNE STEURS.